United States Patent
Nieminen et al.

(10) Patent No.: US 6,877,682 B2
(45) Date of Patent: Apr. 12, 2005

(54) METHOD FOR MONITORING CONDITION OF BEARINGS OF A CRUSHER, AND A CRUSHER

(75) Inventors: Ilpo Nieminen, Siivikkala (FI); Juhamatti Heikkilä, Tampere (FI); Juha Patosalmi, Tampere (FI)

(73) Assignee: Metso Minerals (Tampere) Oy, Tampere (FI)

( * ) Notice: Subject to any disclaimer, the term of this patent is extended or adjusted under 35 U.S.C. 154(b) by 35 days.

(21) Appl. No.: 10/258,178

(22) PCT Filed: Mar. 13, 2002

(86) PCT No.: PCT/FI02/00198
§ 371 (c)(1),
(2), (4) Date: Dec. 9, 2002

(87) PCT Pub. No.: WO02/077476
PCT Pub. Date: Oct. 3, 2002

(65) Prior Publication Data
US 2004/0050983 A1 Mar. 18, 2004

(30) Foreign Application Priority Data
Mar. 23, 2001 (FI) .............................................. 20010599

(51) Int. Cl.⁷ .................................................. B02C 2/04
(52) U.S. Cl. ........................................ 241/36; 241/207
(58) Field of Search .................. 241/36, 210, 30, 241/207

(56) References Cited

U.S. PATENT DOCUMENTS

| | | | | |
|---|---|---|---|---|
| 3,459,378 A | * | 8/1969 | Hill | 241/35 |
| 3,472,046 A | * | 10/1969 | Potter | 464/32 |
| 4,535,942 A | * | 8/1985 | Hayashi | 241/36 |
| 4,666,092 A | * | 5/1987 | Bremer | 241/214 |
| 4,787,563 A | | 11/1988 | Tanaka et al. | |
| 5,451,110 A | * | 9/1995 | Gams et al. | 384/624 |
| 5,490,431 A | * | 2/1996 | O'Mahony et al. | 73/862.331 |
| 5,653,393 A | | 8/1997 | Tanaka et al. | |
| 5,667,157 A | * | 9/1997 | Prew | 241/27 |
| 5,927,623 A | * | 7/1999 | Ferguson et al. | 241/36 |
| 6,360,616 B1 | * | 3/2002 | Halliday et al. | 73/862.49 |

FOREIGN PATENT DOCUMENTS

FI            100554         11/1997

* cited by examiner

Primary Examiner—Daniel C. Crane
(74) Attorney, Agent, or Firm—Oliff & Berridge, PLC (57) ABSTRACT

Malfunctions of sliding bearings of cone crushers used in crushing stone are anticipated by providing sensors in connection to bearing parts, by means of which sensors it is possible to observe increases in friction forces. A beginning bearing damage can be detected by means of sensors at such an early stage, that extensive damage to bearings and to other parts of the crusher can be prevented.

16 Claims, 9 Drawing Sheets

METHOD FOR MONITORING CONDITION OF BEARINGS OF A CRUSHER, AND A CRUSHER

This application is a 371 of PCT/FI02/00198, filed on Mar. 13, 2002.

TECHNICAL FIELD

This invention relates to cone and gyratory crushers. More specifically, the invention relates to the monitoring of sliding bearings of a cone or gyratory crusher so, that an incipient bearing failure can be detected at such an early stage, that extensive damage to bearings and to other parts of the crusher can be prevented.

BACKGROUND ART

In cone crushers there is a perpendicular eccentric shaft and in that shaft an oblique inner bore. In the bore is fitted a main shaft, to which shaft a crushing head is usually attached. The head is laterally surrounded by the crusher frame, to which frame is attached a concave, functioning as a wear part. To the head is correspondingly attached a mantle, functioning as a wear part. The mantle and the concave together form a crushing cavity, and within this, feed material is crushed. When the eccentric shaft is rotated, the main shaft together with the head is forced into an oscillating movement, whereby the gap between the mantle and the concave varies at each location during the work cycle. The smallest gap during a work cycle is called the crusher setting, and the difference between maximum gap and minimum gap is called the crusher stroke. By means of the crusher setting and the crusher stroke, e.g. the particle size distribution of produced crushed stone and the production capacity of the crusher can be controlled.

The main shaft of a crusher is often supported in the crusher frame by a top bearing at its upper end. This subtype of cone crusher is usually referred to as a gyratory crusher.

A gyratory crusher is usually adjustable by a hydraulic system thus, that the main shaft can be moved vertically relative to the crusher frame. This makes possible a change of the setting so, that the particle size of crushed stone will conform to the required size, and/or keeping the setting constant during wearing of the wear parts.

In other types of cone crushers, the adjustment can be made also by raising and lowering the upper crusher frame and the concave attached to it relative to the lower crusher frame and to the main shaft, which remains vertically stationary relative to the lower frame.

In a crusher there are many surfaces associated by sliding bearings. Depending on the type of crusher these include, for example, surfaces between:
  main shaft and eccentric shaft
  eccentric shaft and lower frame
  eccentric shaft and adjusting piston
  main shaft and upper frame
  main shaft and adjusting piston The above-mentioned members are not usually in immediate contact with each other, but in practice there are usually one or more bearing sleeves between them, so the actual bearing surfaces usually form between the above-mentioned members and these bearings.

When the bearings of a crusher work properly, friction forces between the crusher bearing surfaces are minimal. If a crusher is affected by a disturbance in lubrication, the friction forces between bearing surfaces will increase and the bearings will be in danger of seizure. This kind of disturbances can be, for example, crusher overload, contaminants in lubricating oil, or pressure or flow decrease of lubricating oil.

Seizure damage has a tendency to advance in a crusher from one bearing surface to another. Lets assume, for example, that there is a disturbance in the lubrication between the main shaft and the eccentric shaft of a crusher and the mentioned bearing surfaces start to seize. This causes heating of the eccentric shaft. When the heat is conducted to the bearing surface between the eccentric shaft and the crusher frame, the lubrication of this bearing surface can also be impaired, which causes also this bearing surface to start to seize.

The seizure described in this example can also advance in the opposite direction from one bearing surface to another, or it can also advance between other bearing surfaces.

The case described as an example can lead also to a situation, where the bearings of a crusher along with the main parts of a crusher, such as the frame, the main shaft, the eccentric shaft etc. are completely damaged. Repair costs of this kind of total damage are difficult to estimate, because the costs differ greatly from case to case depending on, for example, the crusher type. On an average, the costs may be about between EUR 20 000–50 000 (at year 2000 prices). In addition, the stoppage of a crusher causes considerable costs.

In Finnish patent 100554, a method is disclosed for monitoring the condition of crusher bearings by monitoring the rotation speed of a main shaft around its axis. When the gap of a crusher is full of stones, these stones will decrease the rotation speed of the head and the main shaft. Thus, a relatively large increase in friction between the main shaft and the eccentric shaft is necessary before a change in the rotation speed of the main shaft can be detected. At this point, the damage at the sliding surface between the eccentric shaft and the main shaft has already advanced relatively far.

DETAILED DESCRIPTION OF THE INVENTION

General Description

If an increase of friction forces at the bearing surfaces of a crusher can be detected early enough, it will give an indication of a beginning seizure. Then it is possible to create a procedure to inform the crusher operator about the disturbance. In its simplest form, such an alarm system can be, for example, a light or sound signal. It is also possible to connect the mentioned indication to the control system for the crusher or the whole crushing process thus, that the initial failure will control the crusher or the crushing process in order to keep the damage as small as possible. The indication can be arranged, for example, to:
  open the overpressure valve of the crusher, which will cause the crusher setting to increase quickly and the bearing load to decrease
  disengage the crusher power transmission coupling, which will cause the crusher to stop and the bearing load to decrease
  stop the crusher drive motor, which will cause the crusher to stop and the bearing load to decrease
  shorten the stroke of the crusher, which will cause the bearing load to decrease
  stop the crusher feeder, which will decrease the load of the crusher and the bearings when the crusher becomes empty.

When a beginning seizure can be detected early, the damage cannot advance from one bearing surface to another. It is sufficient to change detachably fitted bearing sleeves or other similar bearing members and to grind the corresponding surface on the major crusher parts. Repair costs are then only about 10–20% of the repair costs caused by total damage. Also the production losses of a crushing plant will decrease because of shorter stoppage. If damage is detected early enough and the damage remains minimal, it is in certain circumstances even possible to postpone repair of the damage to a normal maintenance break.

DETAILED DESCRIPTION

The invention is described in detail in the following with references to the enclosed drawings, wherein.

Figure 1:
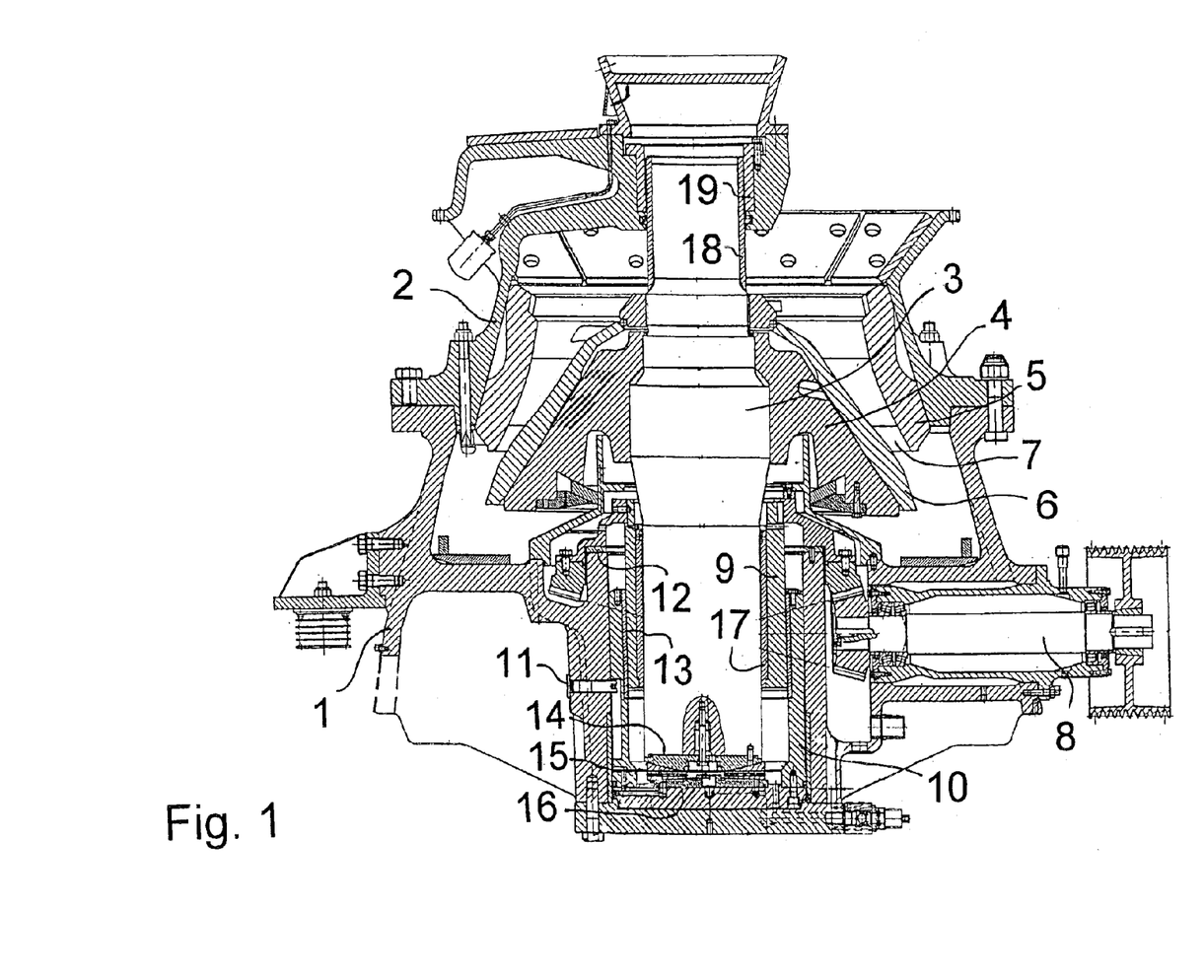
FIGS. 1 and 2 represent typical gyratory crushers in accordance with the state of the art.

The main parts of the crusher shown in FIG. 1 are lower frame 1, upper frame 2, main shaft 3, head 4, concave 5, mantle 6, crushing cavity 7, transmission 8, eccentric shaft 9, adjusting piston 10, adjusting piston guide 11, axial bearing 12 of the eccentric shaft, radial bearing 13 of the eccentric shaft, axial bearing 14, 15, 16 of the main shaft, radial bearing 17 of the main shaft, main shaft protecting sleeve 18, and support bearing 19.

The crusher frame consists of two main units: lower frame 1 and upper frame 2. The concave 5 attached to the upper frame and the mantle 6 attached by means of head 4 to the main shaft 3 forms the crushing cavity 7, into which material to be crushed will be fed from top of the crusher.

Transmission 8, by means of which the eccentric shaft 9 is rotated, is mounted in the lower frame. In the eccentric shaft there is a bore at slanted angle in relation to the crusher central axis, into which bore the main shaft is fitted. When the transmission rotates the eccentric shaft inside the crusher frame, it causes an oscillating movement in the main shaft fitted in the bore in the eccentric shaft.

The crusher setting is adjusted by pumping hydraulic medium into a space between the adjusting piston 10 and the lower frame. In this application, the adjusting piston of the crusher is shaped as a cylinder, open at its upper end and closed at its bottom end, and the hem of the adjusting piston fits between the lower frame of the crusher and the eccentric shaft.

Between the main shaft and the eccentric shaft is the radial bearing 17 of the main shaft, which bearing conveys radial forces affecting the main shaft to the crusher frame. Between the eccentric shaft and the adjusting piston is the radial bearing 13 of the eccentric shaft, carrying out the same task. The axial bearing 12 of the eccentric shaft conveys axial forces between the eccentric shaft and the lower frame.

In the outer surface of the adjusting piston there is a groove, into which is fitted the adjusting piston guide 11, attached to the lower frame of the crusher. The task of the guide is to prevent rotation of the adjusting piston inside the frame of the crusher due to friction forces in the radial bearing of the eccentric shaft and the axial bearing of the main shaft. The prevention of rotation is important, because in this way a sufficiently high relative speed is achieved in parts moving in respect to each other, so that a lubrication film will form.

Axial forces of the main shaft are conveyed to the crusher frame through pressurized hydraulic medium and the axial bearing 14, 15, 16 of the main shaft. In this application the axial bearing consists of three separate parts, whereby at least two of those parts have counter-surfaces which are part of a spherical surface.

Radial forces of the main shaft are conveyed to the upper frame of the crusher through the support bearing 19. Usually, a main shaft protection sleeve is provided in crushers to protect the main shaft from the wearing effect of the material to be crushed.

Figure 2:
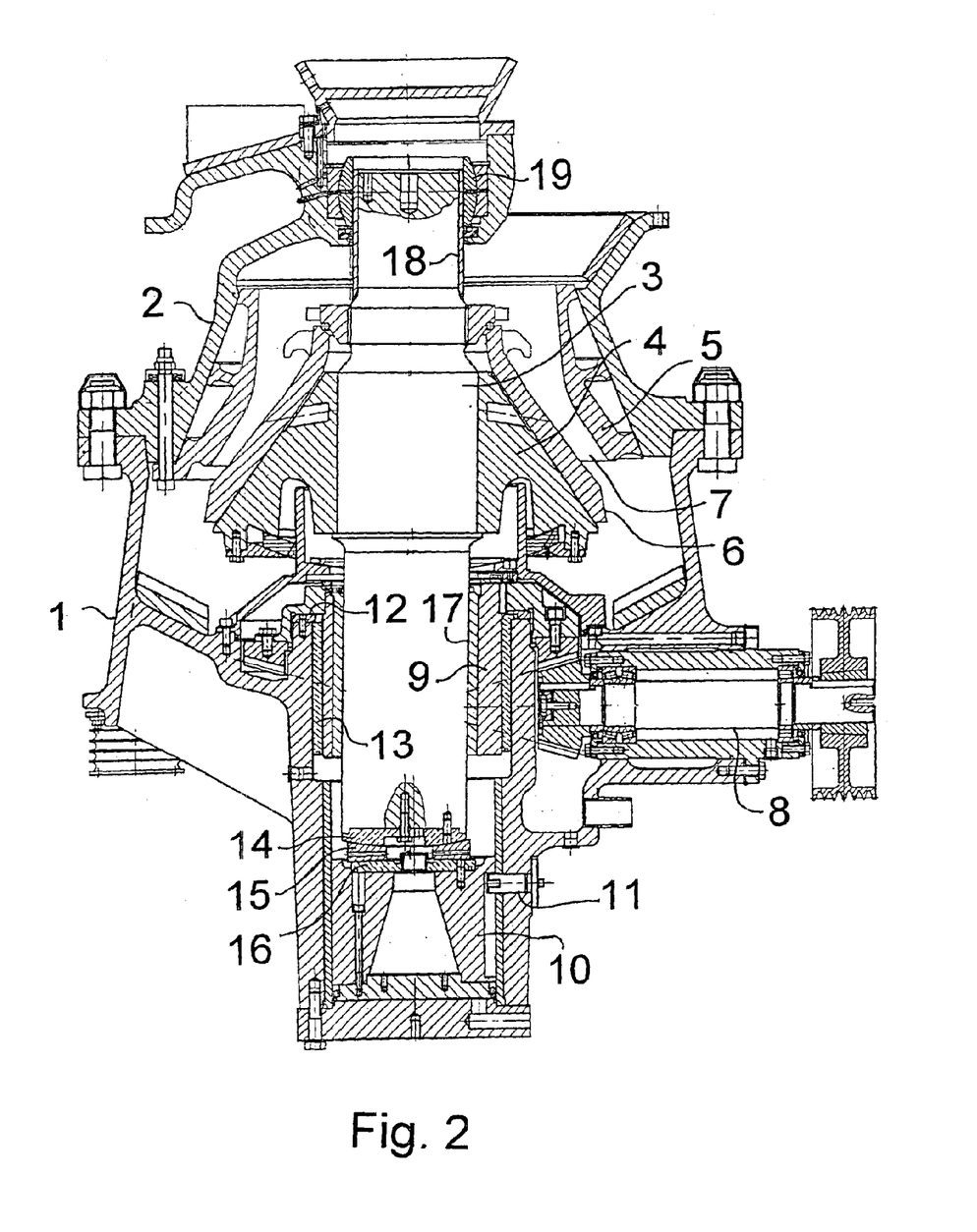

The same main crusher parts shown in FIG. 1 appear in the crusher shown in FIG. 2. The crusher setting is adjusted by pumping hydraulic medium into a space between the adjusting piston 10 and the lower frame. In this application, the adjusting piston is located wholly below the main shaft, and it does not function as a member conveying radial forces of the main shaft to the lower frame of the crusher.

Figure 3:
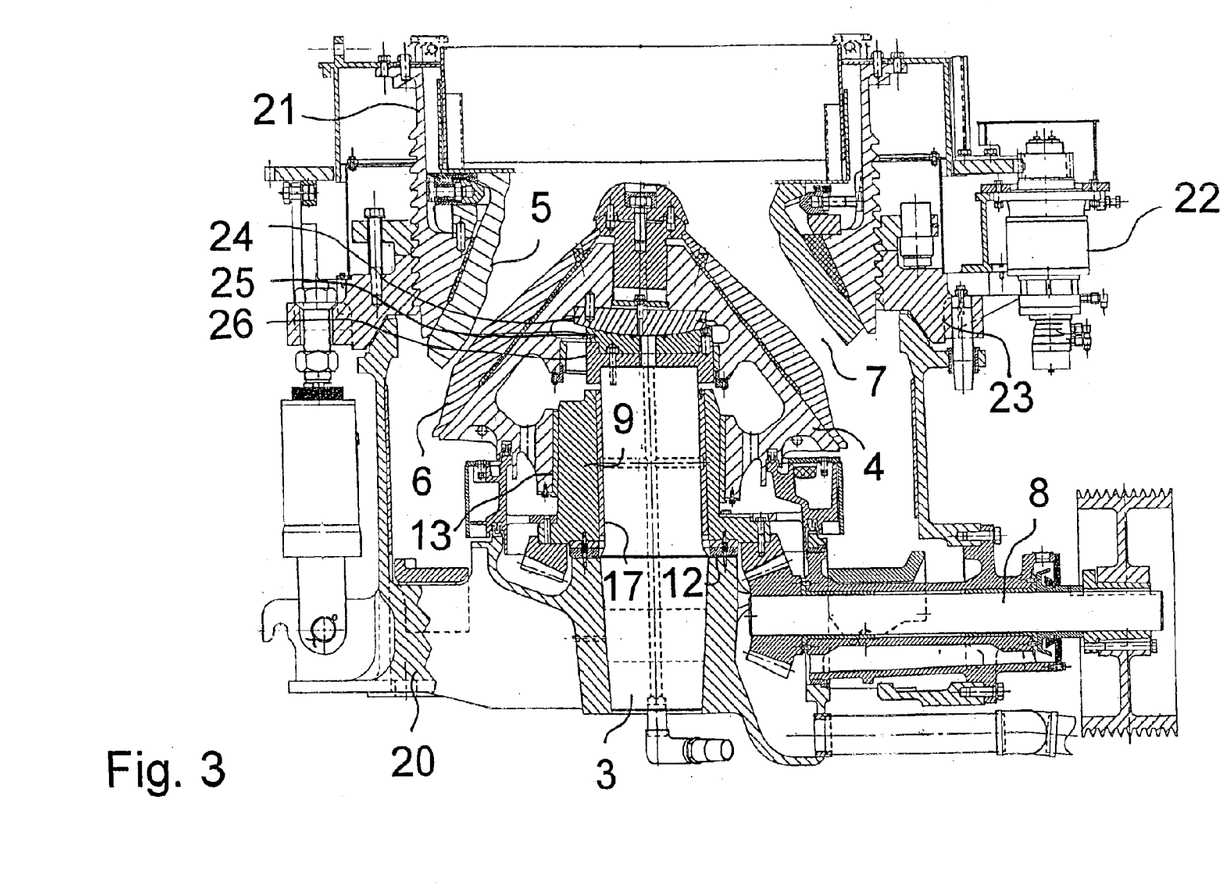
FIG. 3 represents a typical cone crusher in accordance with the state of the art.

The main parts of the crusher shown in FIG. 3 are frame 20, bowl 21, main shaft 3, head 4, concave 5, mantle 6, crushing cavity 7, transmission 8, eccentric shaft 9, adjusting motor 22, adjustment ring 23, axial bearing 12 of the eccentric shaft, radial bearing 13 of the head, axial bearing 24, 25, 26 of the head, and radial bearing 17 of the main shaft. The concave 5 attached to bowl 21 and mantle 6 attached to head 4 form the crushing cavity 7, into which material to be crushed will be fed from top of the crusher.

In the lower frame is placed transmission 8, by means of which the eccentric shaft 9 is rotated. In the eccentric shaft, there is a bore, into which main shaft 3, which is fixed to the frame of the crusher, is fitted. When the transmission rotates the eccentric shaft around the main shaft, it brings the head, which is connected at the main shaft through bearings, into an oscillating movement.

The setting of the crusher is adjusted by rotating the bowl 21 with the adjusting motor 22, which will cause the bowl to rise or lower itself along the threads of the adjustment ring 23.

Between the main shaft and the eccentric shaft there is the radial bearing 17 of the main shaft, which bearing conveys radial forces of the head to the crusher frame. Between the eccentric shaft and the head there is the head radial bearing 13, having the same function. The axial bearing 12 of the eccentric shaft conveys axial forces between the eccentric shaft and the frame of the crusher.

Axial forces of the head are conveyed to the frame of the crusher through head axial bearing 24, 25, 26. In this application, the axial bearing consists of three separate parts, at least two of those parts having counterpart surfaces, which are part of a spherical surface.

Radial forces of the head are conveyed through the radial bearing 17 of the main shaft to the main shaft and further to the frame of the crusher.

Figure 4:
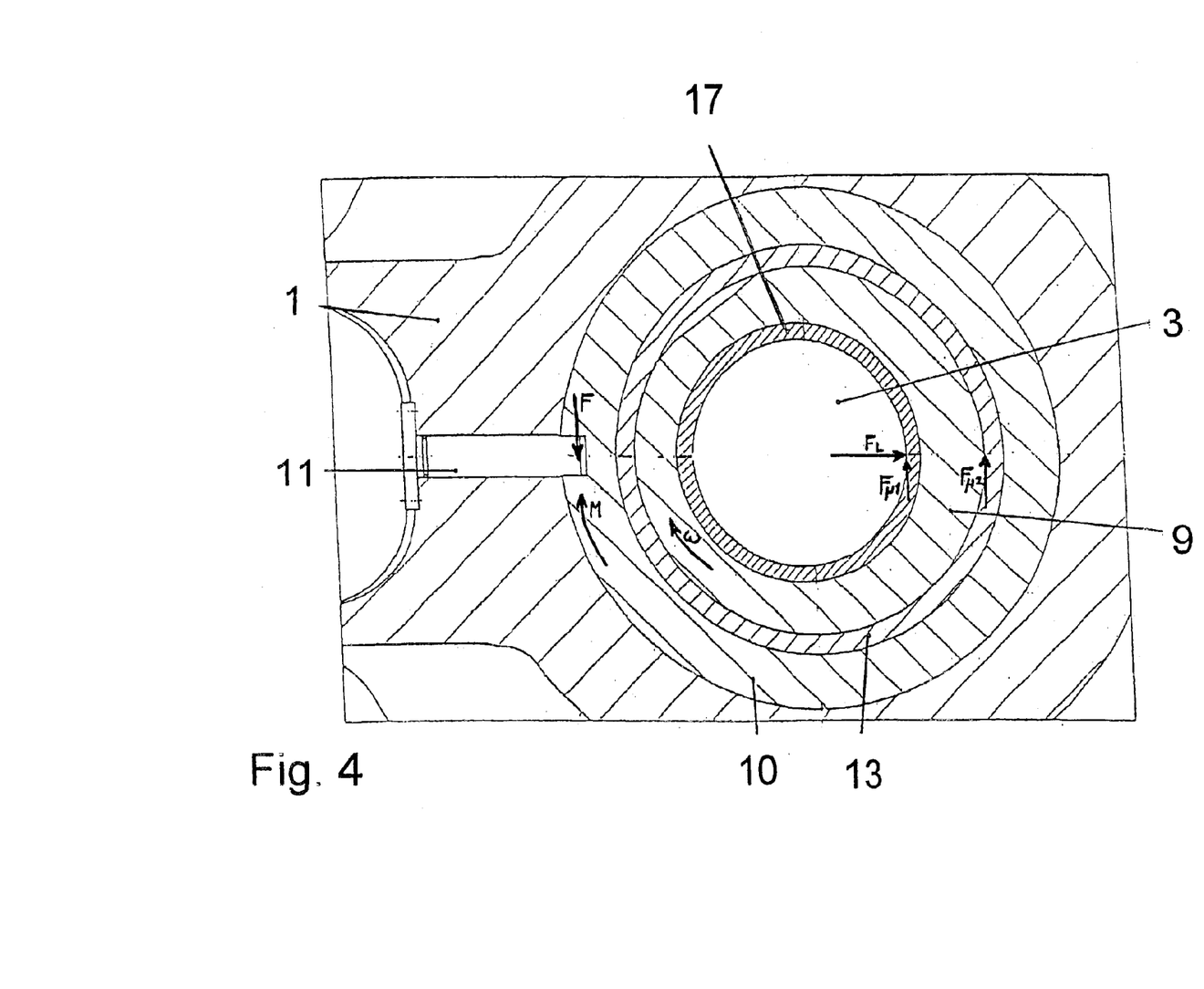
FIG. 4 is an enlarged cross-section bottom view of a detail from the crusher of FIG. 1, also showing forces appearing in bearings and their behavior.

FIG. 4 represents a horizontal cross-section of a lower part of the crusher shown in FIG. 1. The main parts shown are lower frame 1, main shaft 3, eccentric shaft 9, adjusting piston guide 11, radial bearing 13 of the eccentric shaft, and radial bearing 17 of the main shaft.

The figure also shows the following forces appearing in a crusher:

- a radial component $F_L$ of a force acting on the frame of the crusher from the main shaft while material is being crushed
- a friction force $F_{\mu 1}$ caused by the force $F_L$ at the surface between the main shaft and the radial bearing of the main shaft
- a friction force $F_{\mu 2}$ caused by the force $F_L$ at the surface between the eccentric shaft and the radial bearing of the eccentric shaft
- a torque M caused by the friction forces $F_{\mu 1}$ and $F_{\mu 2}$ and acting on the adjusting piston
- a reaction force F, created by the adjusting piston guide and opposing the torque M, which force F prevents the adjusting piston from revolving.

From the main shaft is conveyed the force $F_L$, which causes friction forces $F_{\mu 1}$ and $F_{\mu 2}$, of which the first is a friction force between the main shaft and the radial bearing of the main shaft, and the second is a friction force between the eccentric shaft and the radial bearing of the eccentric shaft. In a normal lubrication situation, the friction coefficient is very small, for example 0,001, which causes the friction force to be also very small.

If the lubrication situation deteriorates, the friction coefficient will increase dramatically and with it the friction force, for example 10 . . . 100 times. Bearing friction causes the torque M at the adjusting piston, which torque is countered by the support reaction F of the adjusting piston guide. By measuring the force F or its effects, information about bearing friction forces can be attained. By simultaneously observing the power used by the crusher, the crusher setting, and the control pressure of the crusher, a fair apprehension of the load situations of different bearings can be gained. If the load and lubrication situation of the bearings turns critical, the damage can be prevented or minimized by controlling the crusher or the material feed, for example by decreasing or halting the input of feed material, by enlarging the crusher setting, by stopping the crusher, or by giving the crusher operator an alert, based on which the operator decides what actions should be taken to eliminate the problem.

Figure 5:
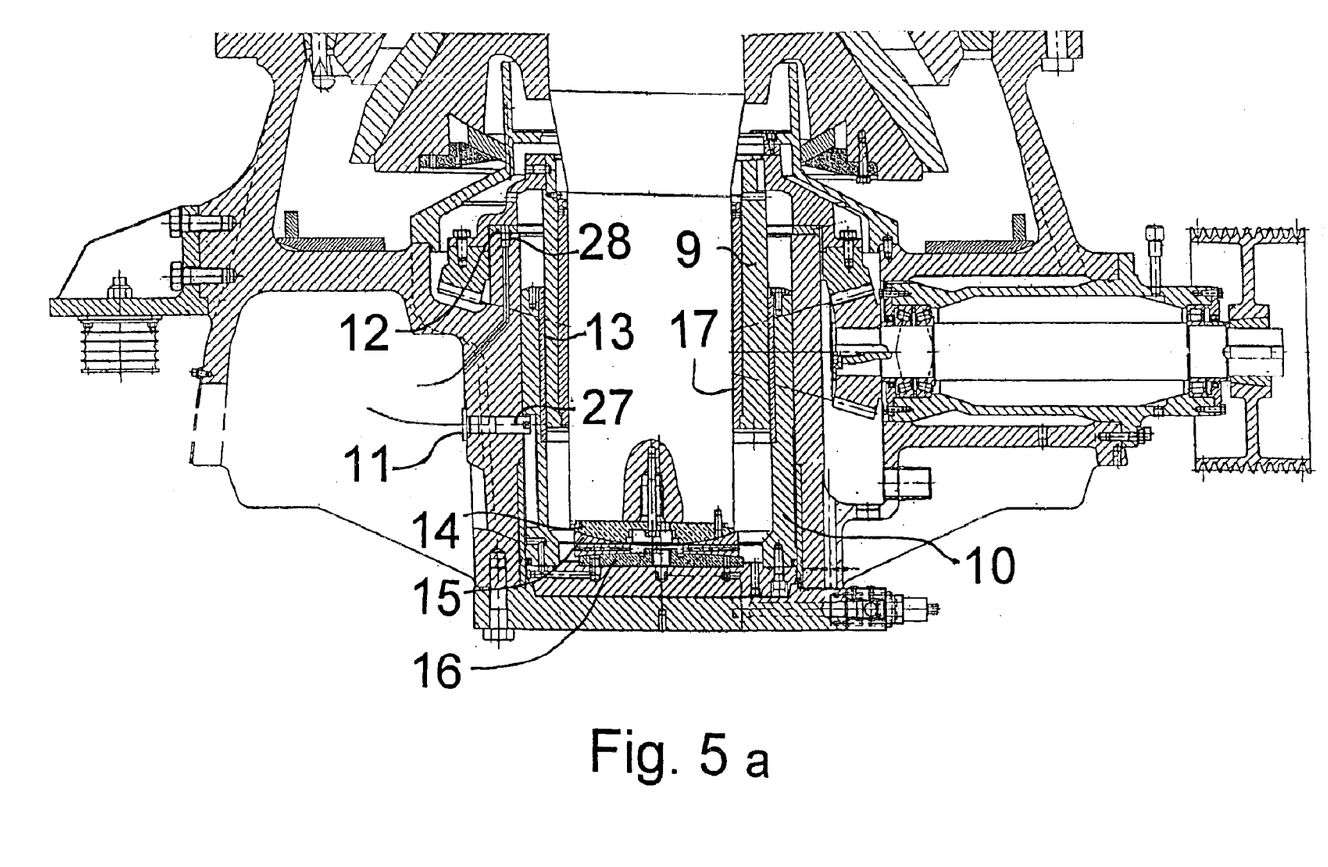
FIG. 5a is an enlarged representation of an embodiment of the invention applied in the bottom section of the crusher of FIG. 1.
FIG. 5b is an enlarged representation of an embodiment of the invention applied in the top section of the crusher of FIG. 1.

In FIG. 5a is represented the lower part of a crusher which is of the type shown in FIG. 1, and which includes, among other things, an eccentric shaft 9, an adjusting piston 10, an axial bearing 12 of the eccentric shaft, a radial bearing 13 of the eccentric shaft, an axial bearing 14, 15, 16 of the main shaft, and a radial bearing 17 of the main shaft as well as sensors 27 and 28. In a crusher in accordance with FIG. 5a, the reaction force of the torque caused by sensor 27 and affecting the adjusting piston 10 is observed by sensor 27. If the sensor detects an increase in the reaction force, it is a sign of a beginning damage at radial bearing 13 of the eccentric shaft, or the axial bearing 17 of the main shaft. The sensor is fitted in the adjusting piston guide 11. The reaction force of a torque caused by the eccentric shaft and acting on the axial bearing 12 of the eccentric shaft is observed by sensor 28. If the sensor detects an increase in the reaction force, it is a sign of beginning damage at the axial bearing of the eccentric shaft.

Figure 5B:
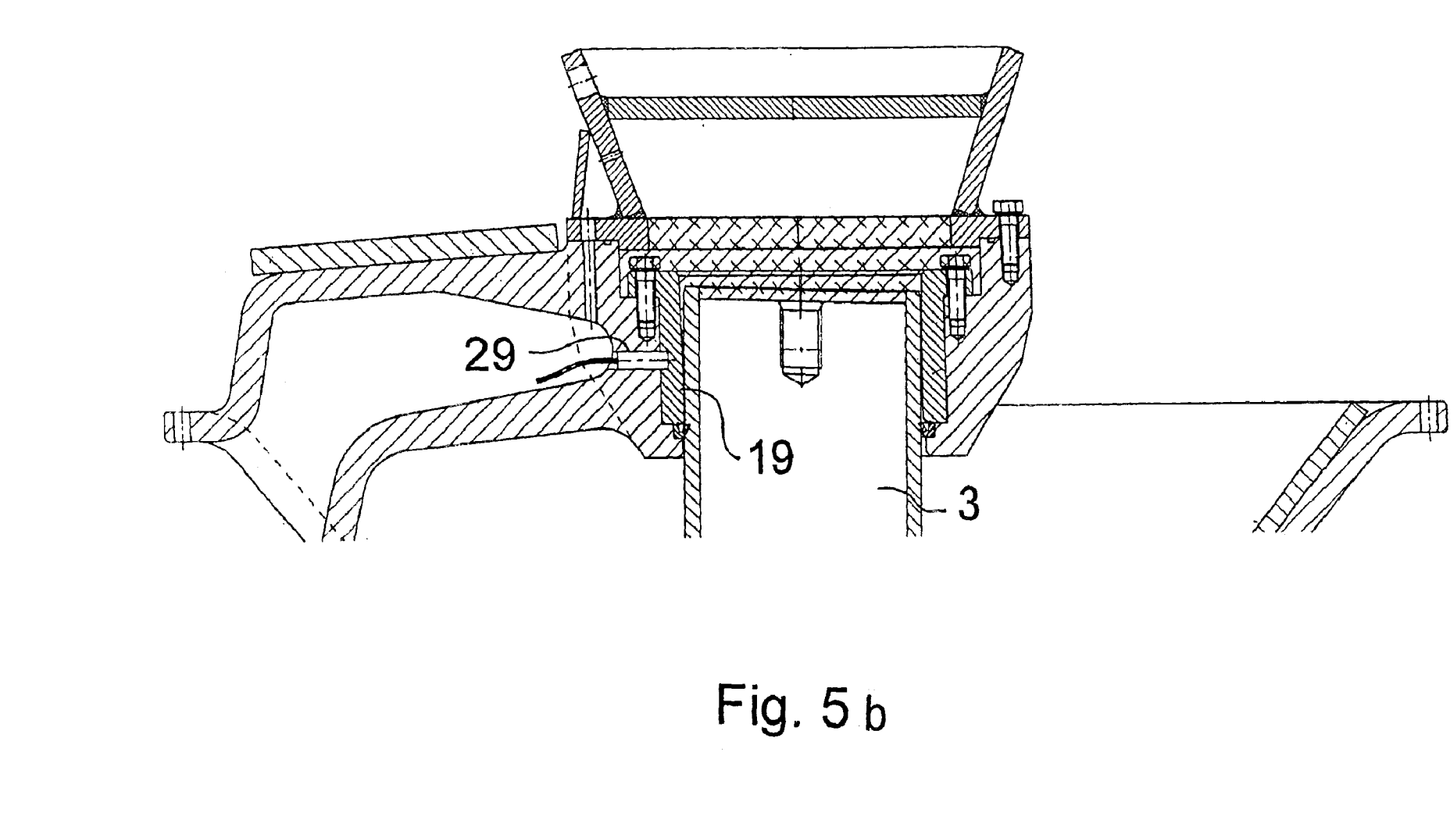

In FIG. 5b is represented the upper part of a crusher which is of the same type as the one shown in FIG. 1, and which includes among other things a main shaft 3, a support bearing 19 and a sensor 29. In a crusher in accordance with FIG. 5b, the reaction force of a torque caused by sensor 29 and affecting the support bearing is observed by sensor 29. If the sensor detects an increase in the reaction force, it is a sign of beginning damage at the support bearing.

In crushers equipped in accordance with FIGS. 5a and 5b can, for example, the shape of the following bearing surfaces be controlled by sensors:

- bearing surfaces of the axial bearing combination 14, 15, 16
- eccentric shaft 9—axial bearing 12 of the eccentric shaft
- eccentric shaft 9—radial bearing 13 of the eccentric shaft
- main shaft 3—support(top) bearing 19.

FIG. 6a represents the lower part of a crusher of the same type as the one shown in FIG. 2 and in accordance with the present invention, and which includes, among others, a main shaft 3, an eccentric shaft 9, an adjusting piston 10, an axial bearing 12 of the eccentric shaft, a radial bearing 13 of the eccentric shaft, an axial bearing 14, 15, 16 of the main shaft, a radial bearing 17 of the main shaft, and sensors 29 and 30. In FIG. 6b is similarly represented the upper part of a crusher in accordance with the present invention, which includes among others a main shaft 3, a support bearing 31, 32, and a sensor 33.

In a crusher in accordance with FIG. 6a, the reaction force of a torque caused by sensor 29 and directed at the radial bearing of the eccentric shaft, is monitored by means of sensor 29. If the sensor detects an increase in the reaction force, it is a sign of a beginning damage in the radial bearing of the eccentric shaft. By means of sensor 30, a reaction force of a torque, caused by the sensor and directed at the adjusting piston, is monitored. If the sensor detects an increase in the reaction force, it is a sign of a beginning damage in the axial bearing of the main shaft.

In a crusher in accordance with FIG. 6b, the reaction force of a torque caused by sensor 33 and directed at the support bearing 31, 32 is monitored by means of sensor 33. If the sensor detects an increase in the reaction force, it is a sign of a beginning damage in the support bearing.

Figure 6:
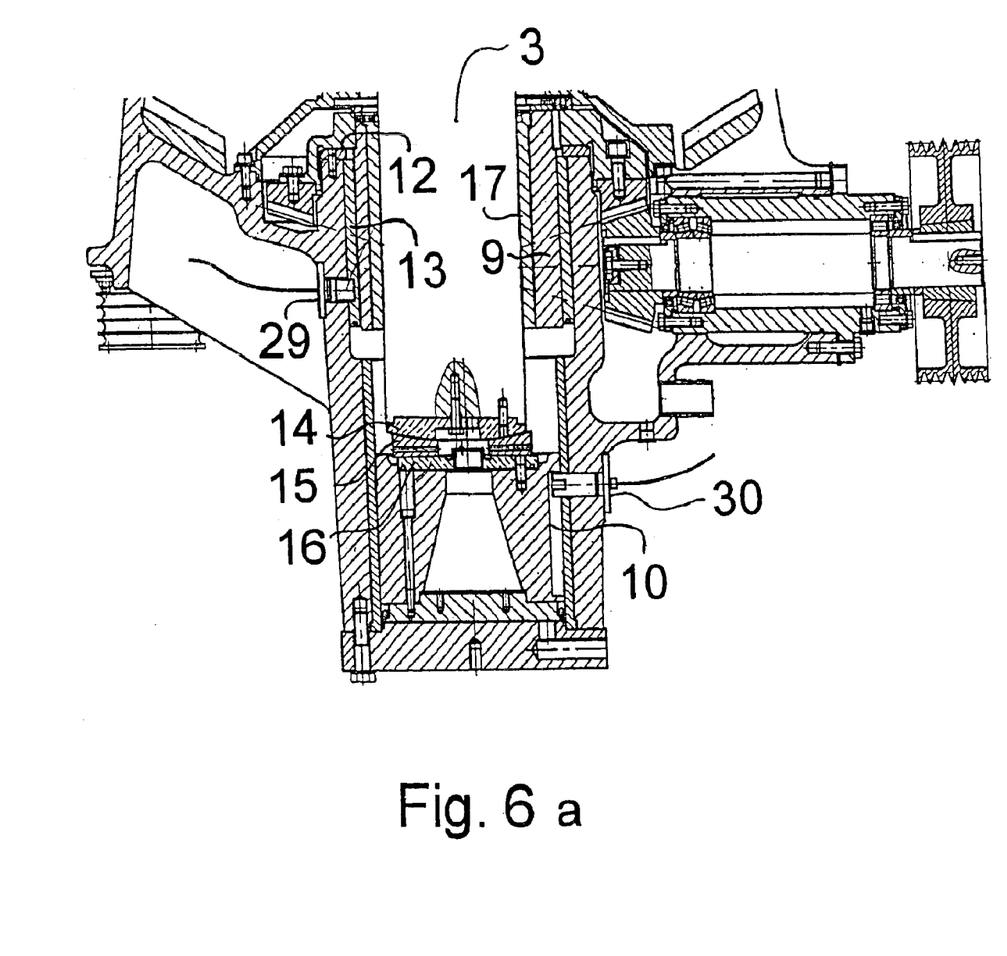
FIG. 6a is an enlarged representation of an embodiment of the invention applied in a bottom section of the crusher shown in FIG. 2.
FIG. 6b is an enlarged representation of an embodiment of the invention applied in a top section of the crusher shown in FIG. 2.

In a crusher in accordance with FIG. 2 and equipped in accordance with FIG. 6, the following bearing surfaces, for example, can be monitored by sensors:

- the bearing surfaces of a bearing combination 14, 15, 16 of the main shaft,
- eccentric shaft 9—axial bearing 12 of the eccentric shaft,
- eccentric shaft 9—radial bearing 13 of the eccentric shaft,
- bearing surfaces 3, 26, 27, 2 between the support bearing combination, the frame, and the main shaft.

Figure 7:
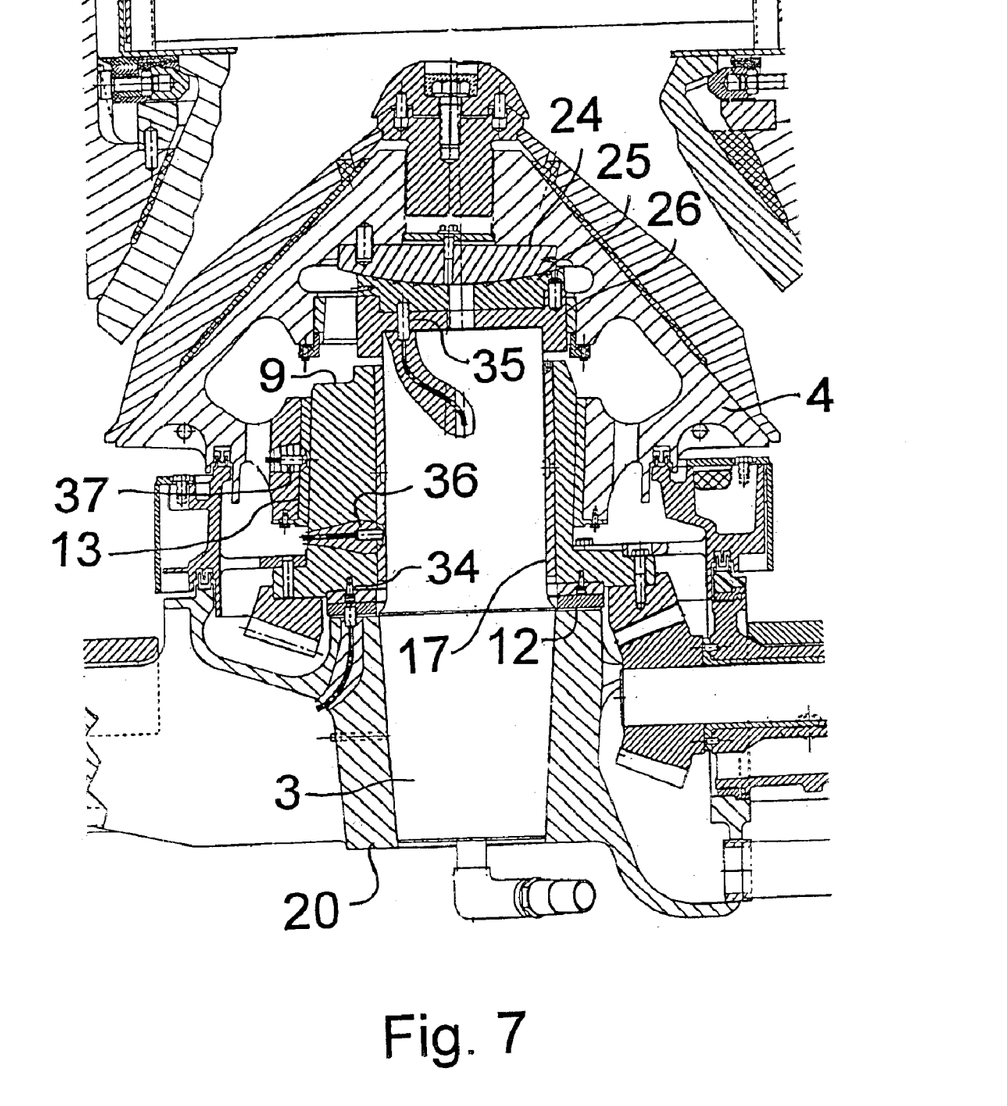
FIG. 7 is an enlarged representation of an embodiment of the invention applied in the crusher shown in FIG. 3.

FIG. 7 is a representation of the middle part of a crusher in accordance with FIG. 3 and equipped with sensors placed in accordance with the present invention. The figure shows, among others, main shaft 3, head 4, eccentric shaft 9, axial bearing 12 of the eccentric shaft, radial bearing 13 of the head, axial bearing 24, 25, 26 of the head, radial bearing 17 of the main shaft, and sensors 34, 35, 36 and 37.

In a crusher in accordance with the FIG. 7, the reaction force of a torque caused by sensor 34 and acting on the axial bearing of the eccentric shaft is monitored by sensor 34. If the sensor detects an increase in the reaction force, it is a sign of a beginning damage in the axial bearing of the eccentric shaft. By means of sensor 35, the reaction force of a torque caused by the head and aimed at the axial bearing of the head, is monitored. If the sensor detects an increase in the reaction force, it is a sign of a beginning damage in the axial bearing of the head. By means of sensor 36, the reaction force of a torque caused by the main shaft and acting on the radial bearing of the main shaft, is monitored. If the sensor detects an increase in the reaction force, it is a sign of a beginning damage in the radial bearing of the main shaft. By means of sensor 37, the reaction force of a torque caused by the sensor and acting on the radial bearing of the head is monitored. If the sensor detects an increase in the reaction force, it is a sign of a beginning damage in the radial bearing of the head.

The sensors 36 and 37 are not in a fixed position with respect to the crusher, but sensor 36 moves with the eccentric shaft and sensor 37 moves with the head. Therefore, the transfer of the sensor signal from the sensor to the outside of the crusher requires special arrangements. However, this function can be accomplished with a slip ring or with a transmitter connected to the sensor and a receiver located outside of the crusher.

In a crusher in accordance with FIG. 7, for example, the following bearing surfaces can be monitored by sensors:

the bearing surfaces of the axial bearing combination 24, 25 of the head, the bearing surfaces between the frame 20 and the eccentric shaft 9, main shaft 3—radial bearing 17 of the main shaft, eccentric shaft 9—radial bearing 13 of the head.

The present invention is not restricted to any particular sensor technology. Monitoring the condition of a bearing can be based not only on measuring a force, but also on measuring a dislocation or, for example, on measurement of a surface pressure. In addition to a force, a bending moment can also be measured as well as a distortion caused by it. Therefore, for example, a piezoelectric sensor, a force sensor, a mechanical sensor, a pressure sensor or a strain-gauge transducer can be used as a sensor.

From the point of view of the invention, it is insignificant in which manner the sensor indicates damage: the indication can be transferred mechanically, hydraulically or electrically. Monitoring can be based not only on the direct monitoring of a bearing, but also on indirect monitoring, through some other part.

What is claimed is:

1. A method for monitoring the condition of bearings in a cone or a gyratory crusher and for decreasing damage caused by a deteriorated bearing wherein friction force between bearing surfaces in a crusher is monitored by a sensor, and information gained from the monitoring of the friction force carried out by the sensor is used in an alerting or control system of the crusher.

2. A method in accordance with claim 1, wherein the friction force between bearing surfaces of the crusher is monitored by a sensor selected from the group consisting of a piezoelectric sensor, a force sensor, a mechanical sensor, a hydraulic sensor or a strain-gauge transducer.

3. A method in accordance with claim 1, wherein the friction force between bearing surfaces is monitored by a sensor integrated in an adjusting piston guide.

4. A method in accordance with claim 1, wherein a signal from one or more sensors is analyzed and by comparing it to reference material previously stored in a control system information is gained about which bearing surface is being damaged.

5. A method in accordance with claim 2, wherein the friction force between bearing surfaces is monitored by a sensor integrated in an adjusting piston guide.

6. A method in accordance with claim 2, wherein a signal from one or more sensors is analyzed and by comparing it to reference material previously stored in a control system information is gained about which bearing surface is being damaged.

7. A method in accordance with claim 3, wherein a signal from one or more sensors is analyzed and by comparing it to reference material previously stored in a control system information is gained about which bearing surface is being damaged.

8. A method in accordance with claim 5, wherein a signal from one or more sensors is analyzed and by comparing it to reference material previously stored in a control system information is gained about which bearing surface is being damaged.

9. A cone crusher comprising at least one sensor, which provides an output signal indicating a friction force between bearing surfaces of the crusher.

10. A crusher in accordance with claim 9, wherein the crusher is a gyratory crusher.

11. A crusher in accordance with claim 9, wherein the sensor is selected from the group consisting of a piezoelectric sensor, a force sensor, a mechanical sensor, a hydraulic sensor or a strain-gauge transducer.

12. A crusher in accordance with claim 9, wherein the sensor is integrated in an adjusting piston guide.

13. A crusher in accordance with claim 10, wherein the sensor is selected from the group consisting of a piezoelectric sensor, a force sensor a mechanical sensor, a hydraulic sensor or a strain-gauge transducer.

14. A crusher in accordance with claim 10, wherein the sensor is integrated in an adjusting piston guide.

15. A crusher in accordance with claim 11, wherein the sensor is integrated in an adjusting piston guide.

16. A crusher in accordance with claim 13, wherein the sensor is integrated in an adjusting piston guide.

* * * * *